US011663013B2

(12) United States Patent
Orzol et al.

(10) Patent No.: US 11,663,013 B2
(45) Date of Patent: May 30, 2023

(54) DEPENDENCY SKIPPING EXECUTION (71) Applicant: International Business Machines Corporation, Armonk, NY (US)

(72) Inventors: Nicholas R. Orzol, Austin, TX (US); Mehul Patel, Austin, TX (US); Dung Q. Nguyen, Austin, TX (US); Brian D. Barrick, Pflugerville, TX (US); Richard J. Eickemeyer, Rochester, MN (US); John B. Griswell, Jr., Austin, TX (US); Balaram Sinharoy, Lagrangeville, NY (US); Brian W. Thompto, Austin, TX (US); Ophir Erez, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/410,230

(22) Filed: Aug. 24, 2021

(65) Prior Publication Data
US 2023/0060910 A1 Mar. 2, 2023

(51) Int. Cl.
*G06F 9/38* (2018.01)
*G06F 9/30* (2018.01)

(52) U.S. Cl.
CPC ........ *G06F 9/3838* (2013.01); *G06F 9/30036* (2013.01); *G06F 9/30043* (2013.01); *G06F 9/3844* (2013.01)

(58) Field of Classification Search
None
See application file for complete search history.

(56) References Cited

U.S. PATENT DOCUMENTS 5,594,864 A * 1/1997 Trauben ................. G06F 11/25
714/39
5,909,573 A 6/1999 Sheaffer
(Continued)

FOREIGN PATENT DOCUMENTS

CN 101965554 A 2/2011
CN 103853526 A 6/2014
(Continued)

OTHER PUBLICATIONS

Koppelman "Early Branch Resolution using a Fast Pre-Execution Core on a Dynamically Scheduled Processor" Deptartment of Electrical & Computer Engineering, Louisiana State University (13 pages).
(Continued)

*Primary Examiner* — John M Lindlof
(74) *Attorney, Agent, or Firm* — Cantor Colburn LLP; Brian Restauro (57) ABSTRACT

A computer processor includes a dispatch stage and a dependency skipping execution unit. The dispatch stage is configured to dispatch a plurality of instructions that include a general purpose instruction configured to produce first data, a dependent instruction configured to produce second data, and an indirect dependent instruction configured to produce third data. The dependency skipping execution unit is configured to monitor the plurality of instructions and to process the indirect dependent instruction in response to the general purpose instruction producing the first data. The indirect dependent instruction is issued independently from the second data produced by the indirect dependent instruction.

17 Claims, 8 Drawing Sheets (56) References Cited

U.S. PATENT DOCUMENTS

| | | | |
|---|---|---|---|
| 5,943,494 | A | 8/1999 | Golla et al. |
| 7,010,676 | B2 | 3/2006 | Busaba et al. |
| 7,502,910 | B2 | 3/2009 | Damron |
| 7,836,289 | B2 | 11/2010 | Tani |
| 8,082,428 | B2 | 12/2011 | Smith et al. |
| 8,555,040 | B2 | 10/2013 | Beaumont-Smith et al. |
| 9,571,394 | B1 | 2/2017 | Sivaramakrishnan et al. |
| 9,710,268 | B2 | 7/2017 | Meier et al. |
| 10,747,536 | B2 | 8/2020 | Grant et al. |
| 11,132,200 | B1 | 9/2021 | Chavan et al. |
| 2009/0235051 | A1 | 9/2009 | Codrescu et al. |
| 2013/0283364 | A1 | 10/2013 | Chang et al. |
| 2014/0345751 | A1 | 11/2014 | Oda et al. |
| 2017/0039072 | A1 | 2/2017 | Gellerich et al. |
| 2018/0004527 | A1* | 1/2018 | Adeeb ............... G06F 9/30094 |
| 2021/0279063 | A1* | 9/2021 | Vasekin ............. G06F 9/3848 |

FOREIGN PATENT DOCUMENTS

| | | |
|---|---|---|
| CN | 104239001 A | 12/2014 |
| CN | 103765400 B | 5/2016 |
| CN | 110688153 A | 1/2020 |
| EP | 0649084 A1 | 10/1994 |
| WO | 2012138950 A2 | 10/2012 |
| WO | 2016210020 A1 | 12/2016 |
| WO | 2017103699 A1 | 6/2017 |

OTHER PUBLICATIONS

List of IBM Patents or Patent Applictions Treated as Related; (Appendix P), Date Filed Aug. 24, 2021, 2 pages.

Patel et al., "Speculative Resolution of Last Branch-on-Count at Fetch", U.S. Appl. No. 17/410,223, filed Aug. 24, 2021.

Uht et al., "Disjoint eager execution: An optimal form of speculative execution." Proceedings of the 28th annual international symposium on Microarchitecture. IEEE, (Nov. 1995) pp. 313-325.

International Search Report; International Application No. PCT/CN2022/112949; International Filing Date: Aug. 17, 2022; dated Oct. 22, 2022; 10 pages.

Balakrishnan, "Revitalizing the Public Internet By Making it Extensible", ACM SIGCOMM Computer Communication Review, vol. 51 Issue 2, Apr. 2021, 7p.

Costa, "Camdoop: Exploiting In-network Aggregation for Big Data Applications", 9th USENIX Symposium on Networked Systems Design and Implementation, 2012, 14p.

Costa, "NetAgg: Using Middleboxes for Application-specific On-path Aggregation in Data Centres", Proceedings of the 10th ACM International on Conference on emerging Networking Experiments and Technologies, Dec. 2014, pp. 249-262, 13 pages.

IBM Corporation, "Manage IT Orchestrate and simplify multicloud", IBM Cloud, 2020, 8p.

Kliazovich, "On packet concatenation with QoS support for wireless local area networks", IEEE Xplore, ResearchGate, Jun. 2005, 6p.

Koppelman, D.M., Early Branch Resolution using a Fast Pre-Execution Core on a Dynamically Scheduled Processor. Department of Electrical & Computer Engineering, Louisiana State University; 13 pages.

Kuaban, "Performance Analysis of Packet Aggregation Mechanisms and Their Applications inAccess (e.g, IoT, 4G/5G), Core, and Data Centre Networks", MDPI, ncbi.com; Jun. 2, 2021, 46p.

Packet Aggregation Scientific Diagram, 2008-2022 ResearchGate, Downloaded Dec. 16, 2022, 6p.

Shenker, "Extensible Internet", International Computer Science Institute, 2022, 1p.

* cited by examiner

DEPENDENCY SKIPPING EXECUTION

BACKGROUND

The present invention generally relates to computer systems, and more specifically, to programmed instruction processing in a microprocessor.

A pipeline microprocessor has a path, channel, or pipeline that is divided into stages that perform specific tasks. Each of the specific tasks are part of an overall operation that is directed by a programmed instruction. As a programmed instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line.

One of the obvious aspects of any assembly line is that there are multiple items resident in the line in successive stages of assembly during any given point in time. The same is true for a pipeline microprocessor. During any cycle of a pipeline clock signal, multiple instructions can be present in the various stages, with each of the instructions being at successive levels of completion. Therefore, microprocessors allow overlapping execution of multiple instructions with the same circuitry. The circuitry is usually divided up into stages and each stage processes a specific part of one instruction at a time, passing the partial results to the next stage.

SUMMARY

According to a non-limiting embodiment, a computer processor comprises a dispatch stage configured to dispatch a plurality of instructions. The plurality of instructions include a general purpose instruction configured to produce first data, a dependent instruction configured to produce second data, and an indirect dependent instruction configured to produce third data. A dependency skipping execution unit is configured to monitor the plurality of instructions and to process the indirect dependent instruction in response to the general purpose instruction producing the first data, wherein the indirect dependent instruction is issued independently from the second data produced by the indirect dependent instruction.

According to another non-limiting embodiment, a computer-implemented method comprises dispatching, via a dispatch stage included in a processor, a plurality of instructions. The plurality of instructions including a general purpose instruction configured to produce first data, a dependent instruction configured to produce second data, and an indirect dependent instruction configured to produce third data. The method further comprises monitoring, via a dependency skipping execution unit included in the processor, the plurality of instructions, and issuing, via the processor, the indirect dependent instruction independently from the second data produced by the dependent instruction. The method further comprises processing, via dependency skipping execution unit, the indirect dependent instruction in response to the general purpose instruction producing the first data.

According to yet another non-limiting embodiment, a computer program product comprises a computer readable storage medium having program instructions embodied therewith. The program instructions are executable by one or more processors to cause the one or more processors to perform operations comprising dispatching, via a dispatch stage included in a processor, a plurality of instructions. The plurality of instructions including a general purpose instruction configured to produce first data, a dependent instruction configured to produce second data, and an indirect dependent instruction configured to produce third data. The operations further comprise monitoring, via a dependency skipping execution unit included in the processor, the plurality of instructions, and issuing, via the processor, the indirect dependent instruction independently from the second data produced by the dependent instruction. The operations further comprise processing, via dependency skipping execution unit, the indirect dependent instruction in response to the general purpose instruction producing the first data.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

In conventional processors that sequentially dispatch a general purpose instruction (e.g., a Load instruction), a dependent instruction (e.g., a Compare Immediate instruction) and an indirect dependent instruction, the indirect dependent instruction must wait for the dependent instruction to produce its results (e.g., a condition code value (CRx)) before the indirect dependent instruction can issue and execute, while also requiring the dependent instruction to wait for the general purpose instruction to produce the results for its corresponding general purpose register (GPRx). The sequence of dependent waiting periods and serial execution of the instructions causes dependency latency that reduces the speed and performance of the processor and computer system.

In accordance with one or more embodiments, a processor employed in a computer system includes a dependency skipping execution unit configured to perform a dependency skipping execution operation. The dependency skipping execution operation allows an indirect dependent instruction to skip waiting for a dependent instruction to execute and instead allows the indirect dependent instruction to wait for the general purpose instruction (e.g., a Load instruction) to execute and produce the corresponding result. When the general purpose instruction (e.g., the Load instruction) is producing the result, the dependent instruction (e.g., the Compare Immediate instruction) will be woken up to issue and execute. The indirect dependent instruction, (e.g., the Conditional Branch instruction), will also wake up simultaneously with the dependent instruction. Thus, the indirect dependent instruction and the dependent instruction can essentially be issued and executed in parallel (e.g., simultaneously) with one another. Accordingly, the register dependency skipping execution described according to one or more non-limiting embodiments allows the indirect dependent instruction to execute and produce its result without waiting for the dependent instruction to finish execution (e.g., independent from the instruction state or result associated with the dependent instruction). In this manner dependency latency is reduced so as to improve the overall performance of the processor and computer system.

Figure 1:
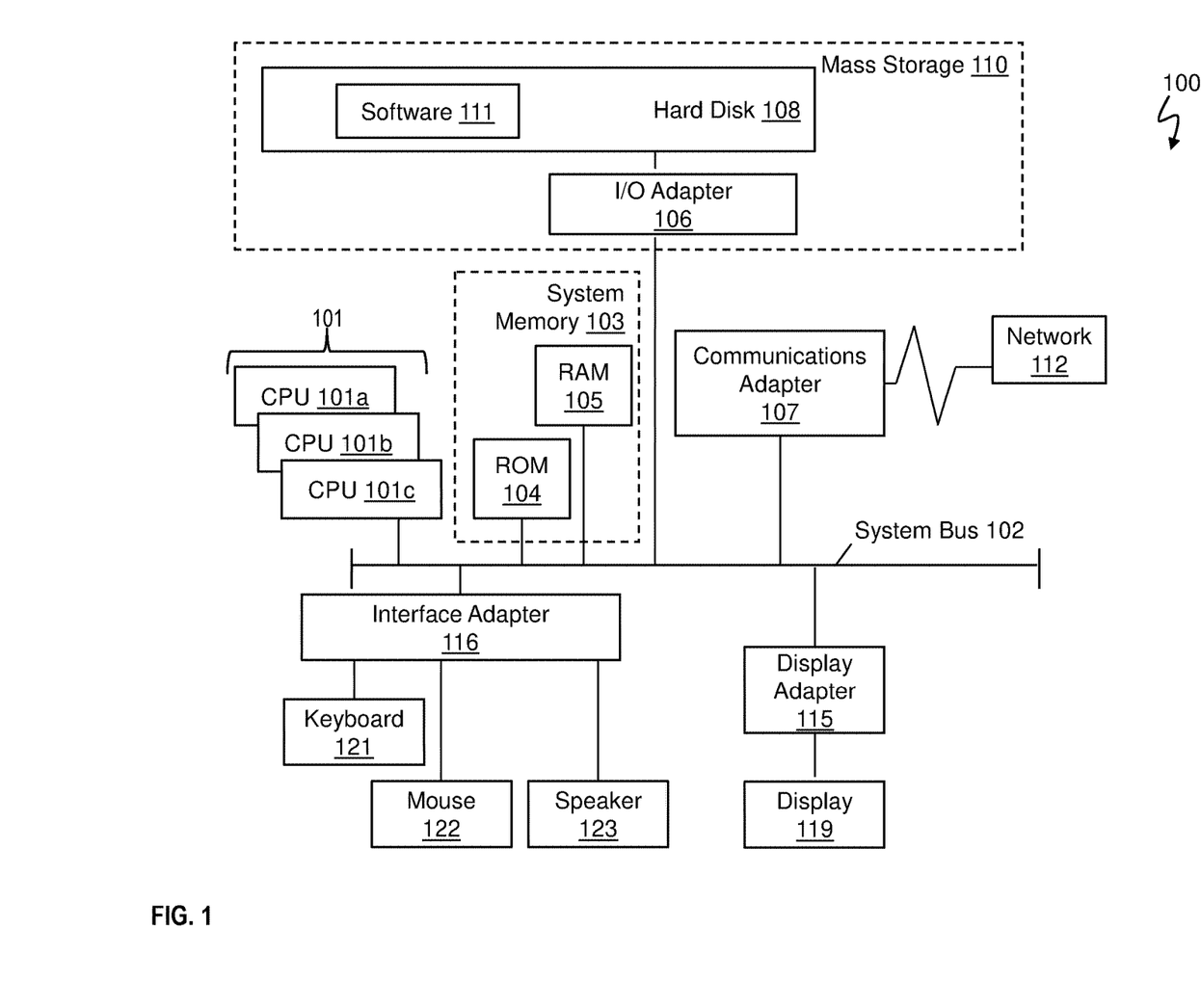
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
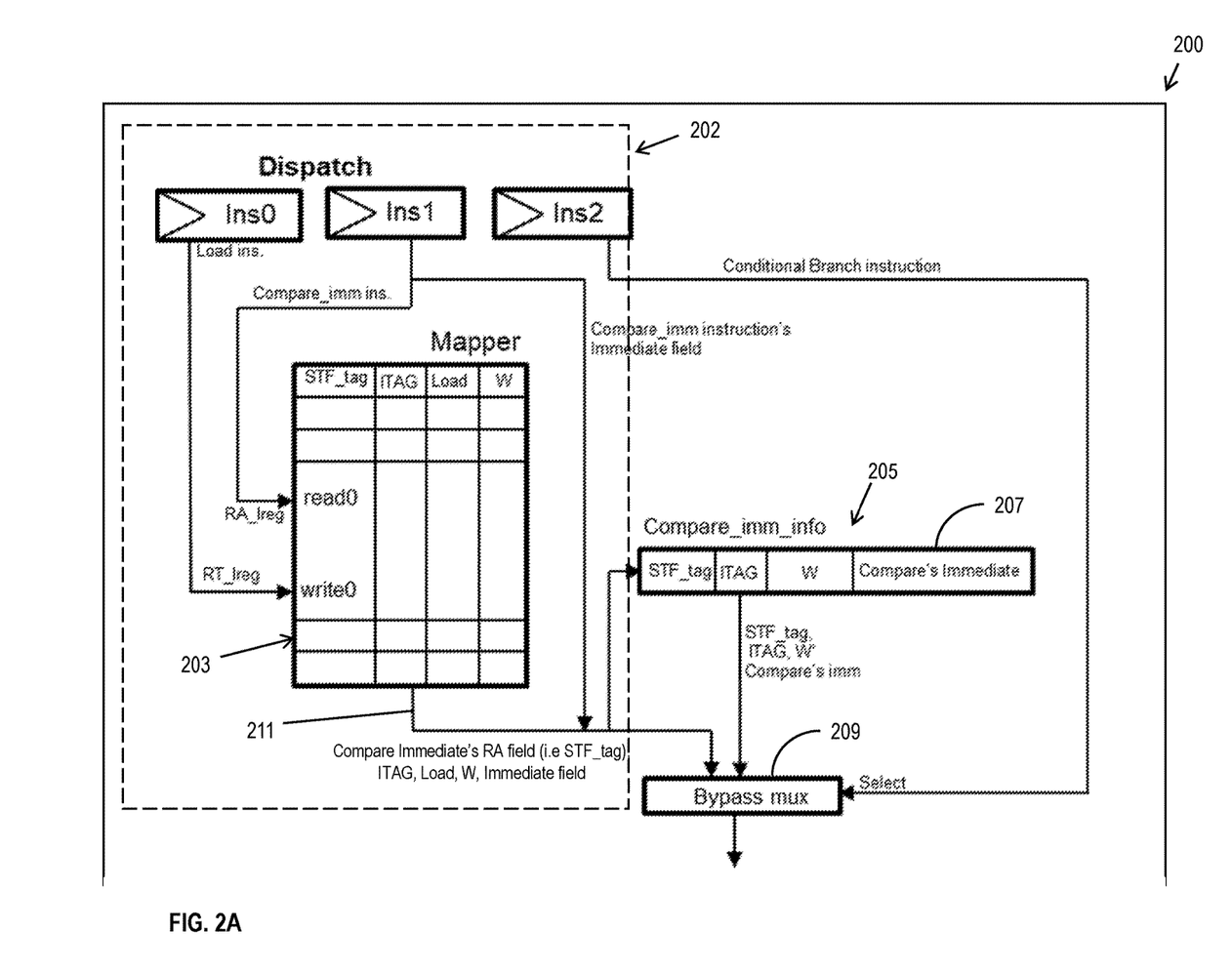
FIGS. 2A and 2B depict a processor included in a computing system according to a non-limiting embodiment.
Figure 2B:
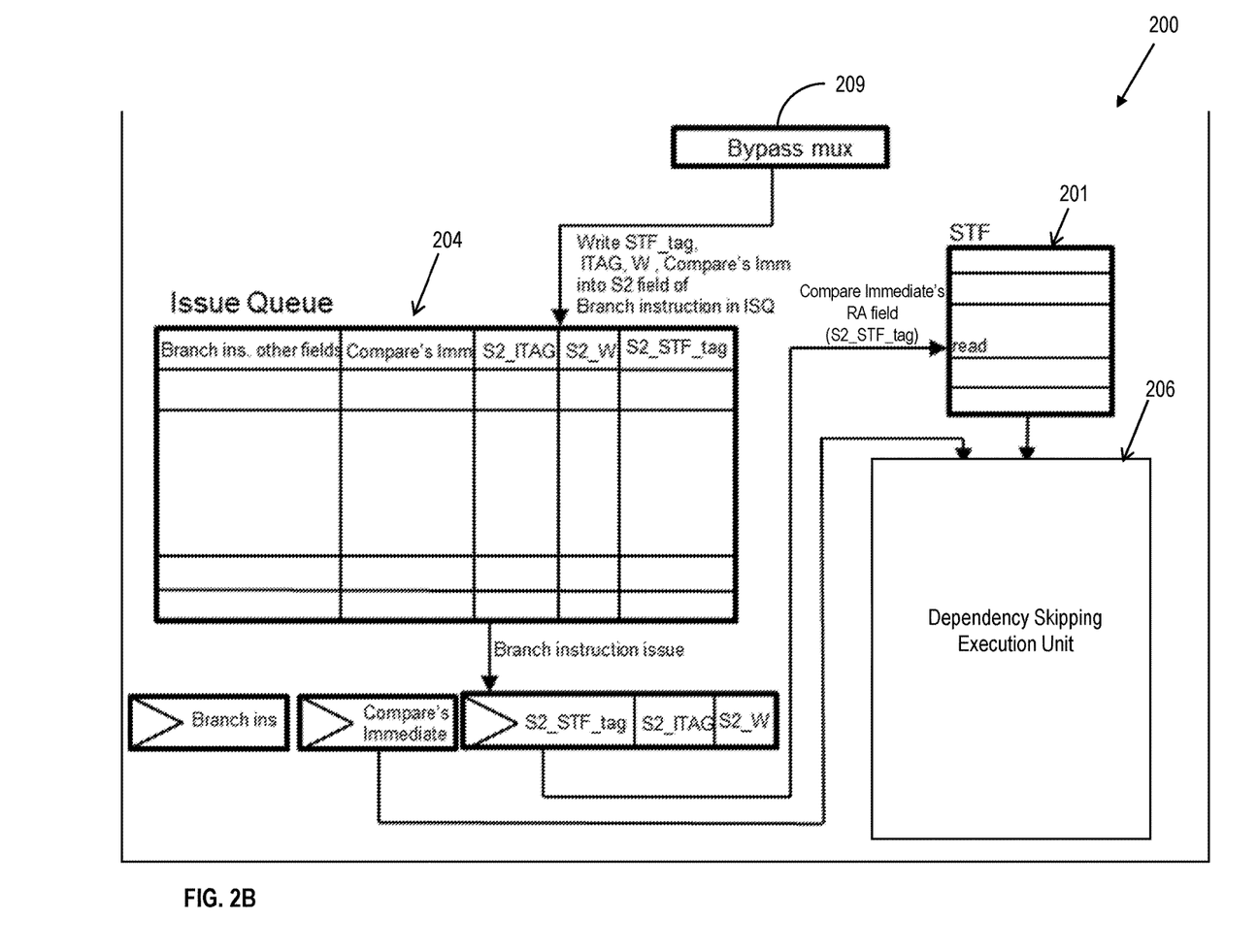

FIGS. 2A and 2B depict an example of a hardware computer processor 200 according to one or more embodiments of the invention. The processor 200 can be representative of any of the processors 101 discussed in computer system 100 in FIG. 1. The processor 200 establishes an example of a high-level architecture of an instruction pipeline configured to facilitate an instruction flow through various stages. The pipeline stages can include, but are not limited to, an instruction fetch stage, an instruction dispatch stage, an instruction decode/issue stage, an instruction execute stage, an instruction commit stage, and a writeback stage. It should be appreciated that the example processor 200 illustrated in FIGS. 2A and 2B is not intended to include every detail of an instruction pipeline, and can include fewer or more modules, blocks and/or stages as understood by one of ordinary skill in the art.

The various components, modules, stages, engines, etc., described regarding FIGS. 2A and 2B can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the modules described herein can be a combination of hardware and programming. The programming can be processor executable instructions stored on a tangible memory, and the hardware can include processing circuitry for executing those instructions. Alternatively or additionally, the modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Further, the modules can include various logic circuits to function as discussed herein.

With continued reference to FIGS. 2A and 2B, the processor 200 includes a dispatch stage 202, an issue queue (ISQ) 204, and a dependency skipping execution unit 206. At the dispatch stage 202, a decoded instruction is dispatched to a mapper module 203, and also to the issue queue 204 where instructions wait for data and an available execution unit. In response to receiving the decoded instruction, the mapper module 203 compares the source operands of the instruction (e.g., a dependent instruction) to the destination of another instruction (e.g., a general purpose instruction or data-producing instruction) and determines a match, indicating that the data-consumer instruction is dependent on the producer instruction. The mapper module 203 then passes this information to the issue queue 208. An instruction in the issue queue 204 is typically issued to an execution unit located at an execution stage.

As an example going forward, the general purpose instruction will be referred to as a "Load" instruction, the dependent instruction will be referred to as a "Compare Immediate" instruction, and the indirect dependent instruction will be referred to as a "Conditional Branch" instruction. It should be appreciated, however, that the dependency skipping operation performed by the dependency skipping execution unit 206 can be applied to other types of instructions without departing from the scope of the inventive teachings. In the scenario of a "Load-Compare Immediate-Conditional Branch" instruction sequence, information associated with the Conditional Branch instruction issued from the issue queue 204 is delivered to a slice-target register file (STF) module 201, where it is read to determine the S2 unit and STF_tag data. The obtained S2 unit and STF_tag data is then delivered from the STF module to the dependency skipping execution unit 206.

Conventional architectures require that an indirect dependent instruction (e.g., the Conditional Branch instruction) must wait for the dependent instruction (e.g., the Compare Immediate instruction) to produce its results (e.g., a condition code value) before the indirection dependent instruction can issue and execute, while also requiring the dependent instruction to wait for the general purpose instruction (e.g., the Load instruction) to produce the results for its corresponding register (e.g., a general purpose register (GPRx)). The sequence of dependent waiting periods and serial execution of the instructions causes dependency latency that reduces the speed and performance of the processor and computer system.

Unlike conventional architectures, the dependency skipping execution unit 206 monitors the instruction state of the instructions dispatched from the dispatch stage 202 (e.g., the Load instruction, the Compare Immediate instruction, and the Conditional Branch instruction) and performs a dependency skipping execution that allows the indirect dependent instruction (e.g., the Conditional Branch instruction) to skip waiting for the dependent instruction to execute and instead allows the indirect dependent instruction to wait for the general purpose instruction (e.g., the Load instruction) to execute and produce its result (e.g., corresponding to its general purpose register (GPRx)). In other words, the Conditional Branch instruction can skip waiting on the Compare Immediate instruction to produce its condition code result, and instead look directly to the result of the Load instruction in order to initiate the issuing and execution of the Conditional Branch instruction.

For example, when the Load instruction is producing its result, the dependent Compare Immediate instruction is woken up to issue and execute. The Conditional Branch instruction will also wake up simultaneously with the Compare Immediate instruction, and thus can be issued and executed in parallel with the Compare Immediate instruction without having to wait for the Compare Immediate instruction to generate its condition code result (CRx). Accordingly, the register dependency skipping execution operation described according to one or more non-limiting embodiments of the present disclosure allows the Conditional Branch instruction to execute and produce its result without waiting for the Compare Immediate instruction to finish execution (e.g., independently from the state of the Compare Immediate instruction). In this manner, the dependency latency of the computer system is reduced, thereby improving the operation and performance of the processor and computer system.

Figure 3:
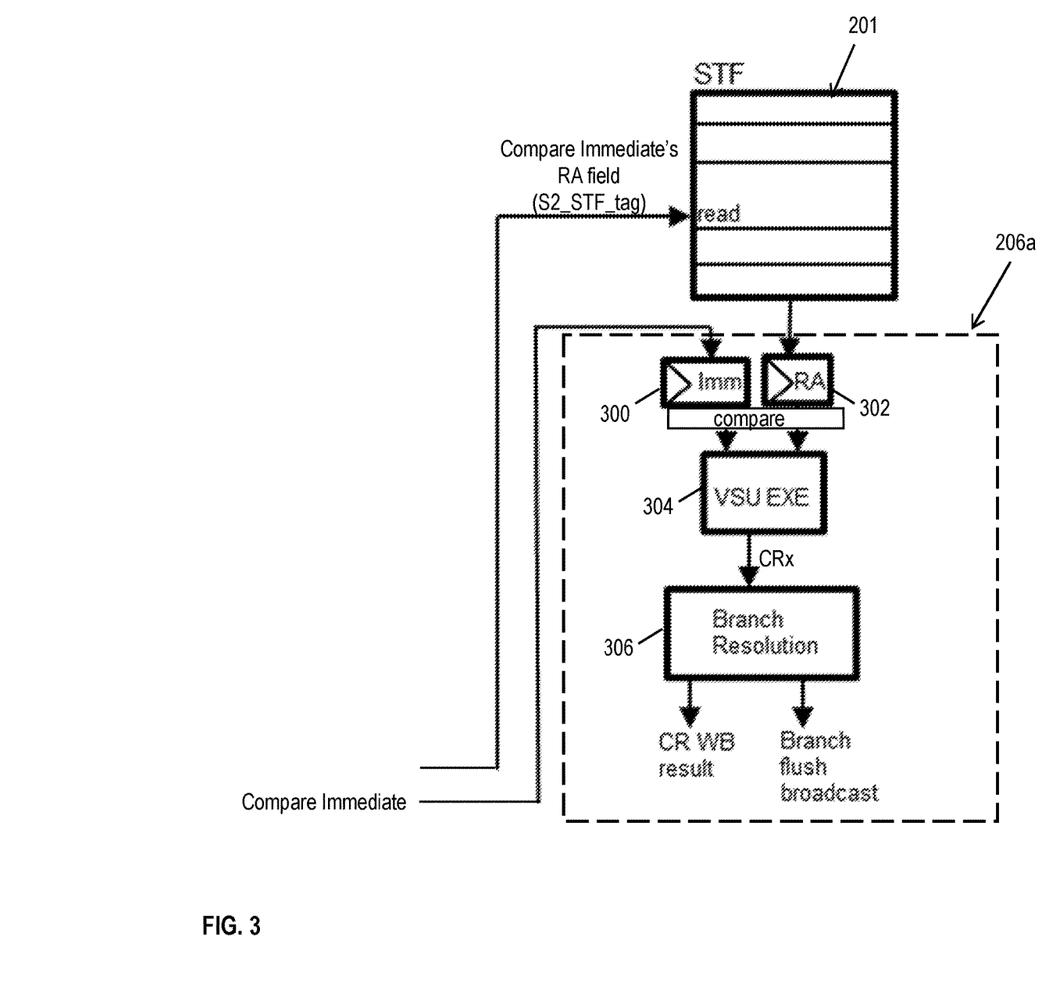
FIG. 3 depicts a dependency skipping execution unit included in the processor illustrated in FIGS. 2A and 2B according to a non-limiting embodiment.

Turning now to FIG. 3, a dependency skipping execution unit 206a included in the processor 200 shown in FIGS. 2A and 2B is illustrated according to a non-limiting embodiment. The dependency skipping execution unit 206a includes a Compare Immediate module (IMM) 300, an operand module 302 (e.g. Compare Immediate's RA field), a vector scalar unit (VSU) execute module 304 and a branch resolution module 306. Any one of the IMM 300, operand module 302, VSU execute module 304, and a branch resolution module 306 can be constructed as an electronic hardware controller that includes memory and a processor configured to execute algorithms and computer-readable program instructions stored in the memory. In addition, the IMM 300, operand module 302, VSU execute module 304, and a branch resolution module 306 can all be implemented in a single controller.

According to the non-limiting embodiment shown in FIG. 3, the dependency skipping execution unit 206a can operate to process a sequence of instructions (e.g., three instructions) that includes a Load instruction (I0), a Compare Immediate instruction (I1) and a Conditional Branch instruction (I2), where the Load instruction (I0) is the oldest instruction in the sequence. In this example, the Conditional Branch instruction (I2) waits for the Load instruction (I0) to produce a result before the Conditional Branch instruction (I2) can be issued and executed. The Compare Immediate instruction (I1) will also need to wait for the Load instruction (I0) to execute and provide the Load data. Unlike conventional systems, however, the Conditional Branch instruction (I2) is not required to wait for the condition code result (CRx) generated by the Compare Immediate instruction (I1) to be available before waiting for the VSU execute module 304 to execute and resolve the Conditional Branch instruction (I2) at execution time (i.e., when the condition code result (CRx) is known at the VSU execute module 304.

With continued reference to FIG. 3 along with FIGS. 2A and 2B, an example description of the system's capability to process a sequence of instructions that includes a "Load" instruction (I0), a "Compare Immediate" instruction (I1) also referred to as a "Compare" instruction, and a "Conditional Branch" instruction (I2) also referred to as a "Branch" instruction. As mentioned above, the Load instruction (I0) is the oldest instruction in the sequence. It should be appreciated that operation of the system 200 is not limited to the sequence described herein and/or is not limited to only three instructions.

The dispatch stage 202 can determine that a Load instruction (I0) is being dispatched and in response writes the corresponding destination STF_tag, ITAG, Load bit, and W bit into mapper module 203. The dispatch stage 202 further determines that a Compare Immediate instruction (I1) is being dispatched, and reads the mapping information stored in the mapper module 203 to determine the Load instruction's STF_Tag, ITAG, Load bit, and W bit. When the Load bit=1, the dispatch stage 202 writes all the information into a Compare_Imm_info register 205 along with the Immediate field 207 of the Compare Immediate instruction (I1). Accordingly, the Compare_Imm_info register 205 now holds information that the Compare Immediate instruction (I1) is waiting for before it can be executed.

In response to dispatching the Conditional Branch instruction (I2), the STF_tag, ITAG, W, and Compare's Immediate bits 207 are obtained from the Compare_Imm_info register 205 and written to the Issue Queue 204 along with the data associated with the Conditional Branch instruction (I2). If the Compare Immediate instruction (I1) and the Conditional Branch instruction (I2) are dispatched in the same cycle, then bypass multiplexer (MUX) 209 will instead select the information from the mapper module 203. Accordingly, the S2 field of the Issue Queue 204 will contain the STF tag, ITAG, and W bits of the Compare Immediate instruction (I1). When the Load instruction (I0) is issued for execution, it will simultaneously wake up both the Compare Immediate instruction (I1) and the Conditional Branch instruction (I2). Accordingly, the Compare Immediate instruction (I1) will be issued and executed as normal, and the Branch instruction (I2) will be issued and executed in parallel (e.g., simultaneously) with the Compare Immediate instruction (I1). In other words, the Conditional Branch instruction (I2) can be issued and executed in parallel with the Compare Immediate instruction (I1) instead of waiting to issue and execute until after the Compare Immediate instruction provides a corresponding condition code result (CRx).

With continued reference to FIG. 3, the Branch instruction (I2) will read the operand module 302 to determine the Load instruction's write back result (e.g., using the S2_STF_tag). The Conditional Branch instruction (I2) will also obtain the Compare Immediate field associated with the Compare Immediate Instruction (I1) using the issuing Branch instruction (I2). The RA data output from the operand module 302 is compared with the Compare Immediate data output from the IMM module 300 to produce the condition code result CRx, which is delivered to the VSU execute module 304. Accordingly, the Branch resolution module 306 resolves the branch prediction through the VSU execute module 304 using the resulting condition code result (CRx) that it produced earlier. In addition, the Compare Immediate instruction (I1) writes the condition code result (CRx) to a CR register and finishes as normal. The Branch resolution module 306 also resolves the branch prediction (e.g., completes the Conditional Branch Instruction (I2)) and then finishes as normal.

Figure 4:
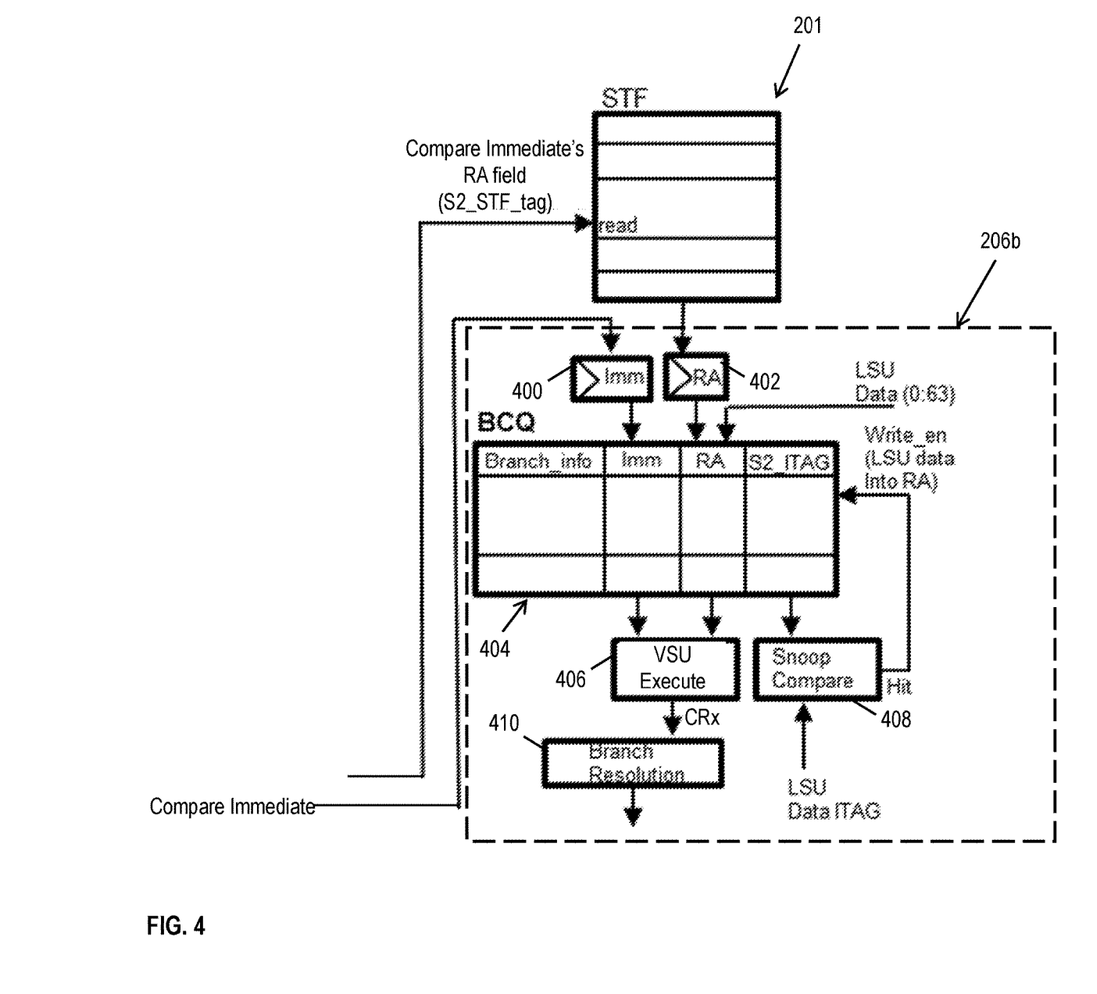
FIG. 4 depicts a dependency skipping execution unit included in the processor illustrated in FIGS. 2A and 2B according to another non-limiting embodiment.

Referring now to FIG. 4, a dependency skipping execution unit 206b included in the processor 200 shown in FIGS. 2A and 2B is illustrated according to another non-limiting embodiment. The dependency skipping execution unit 206b includes a Compare Immediate module (IMM) 400, an operand module (e.g. Compare Immediate's RA field) 402, a branch condition queue (BCQ) 404, a VSU execute module 406, a snoop compare module 408, and a branch resolution module 410. Any one of the IMM 400, the operand module 402, the BCQ 404, the VSU execute module 406, the snoop compare module 408, and the branch resolution module 410 can be constructed as an electronic hardware controller that includes memory and a processor configured to execute algorithms and computer-readable program instructions stored in the memory. In addition, the IMM 400, the operand module 402, the BCQ 404, the VSU execute module 406, the snoop compare module 408, and the branch resolution module 410 can all be implemented in a single controller.

According to the non-limiting embodiment shown in FIG. 4, in the example of a sequence of instructions (e.g., three instructions) that includes a "Load" instruction (I0), a "Compare Immediate" instruction (I1), and a "Conditional Branch" instruction (I2) where the Load instruction (I0) is the oldest instruction in the sequence, the dependency skipping execution unit 206b allows the Conditional Branch instruction (I2) to skip waiting for a Compare Immediate instruction (I1) to execute. Instead, the Conditional Branch instruction (I2) waits for the Load instruction (I0) to execute and produce a result. When the Load instruction (I0) is producing the result, the dependent Compare Immediate instruction (I1) is woken up to issue and execute. The Conditional Branch instruction (I2) stored in the BCQ 404 will also wake up simultaneously with the Compare Immediate instruction (I1), and a compare execution will be performed by the compare execute unit 406 to generate a corresponding condition code result (CRx).

The branch resolution module 410 obtains the condition code result (CRx) from the VSU execute module 406 and resolves the branch prediction (e.g., completes the Conditional Branch instruction (I2)). In this manner, the dependency skipping execution unit 206b allows the Conditional Branch instruction (I2) to execute without waiting for the Compare Immediate instruction (I1) to finish execution and produce its result (e.g., produce its condition code result).

According to an example, the BCQ 404 is configured to store the data associated with the Compare Immediate instruction (I1) (e.g., received from an instruction fetching unit (IFU)), while also snooping load/store unit (LSU) write back data. In other words, the LSU executes the Load instruction (I0) and then returns the write back data to the dependent instruction to be consumed. When the LSU write back data is available at the BCQ 404, the BCQ 404 will output the Compare Immediate data and the Conditional branch data, and the VSU execute module 406 will perform the comparison to generate the condition code result (CRx). Accordingly, the branch resolution module 410 obtains the condition code result (CRx) and resolves the Branch (e.g., completes the Conditional Branch instruction (I2)) which has already been issued independently with respect to the issue and execution state of the Compare Immediate instruction (I1).

Referring to FIGS. 2A and 2B along with FIG. 4, an example description of the system's capability to process a sequence of three instructions that includes a "Load" instruction (I0), a "Compare Immediate" instruction (I1) also referred to as a "Compare" instruction, and a "Conditional Branch" instruction (I2) also referred to as a "Branch" instruction. As mentioned above, the Load instruction (I0) is the oldest instruction in the sequence. It should be appreciated, however, that operation of the system 200 is not limited to the sequence described herein and/or is not limited to only three instructions.

The dispatch stage 202 determines that the Load instruction (I0) is being dispatched and in response writes the destinations of the STF_tag, ITAG, Load bit, and W bit into the mapper module 203. The dispatch stage 202 further determines that the Compare Immediate instruction (I1) is being dispatched, and reads the mapping information stored in the mapper module 203 to determine the Load's STF_Tag, ITAG, Load bit, and W bit. When the Load bit=1, the dispatch stage 202 writes all the information into a Compare_Imm_info register 205 along with the Compare Immediate field 207 associated with the Compare Immediate instruction (I1). Accordingly, the Compare_Imm_info register 205 now holds information that the Compare Immediate instruction (I1) is waiting for before it can be executed.

When the Branch Conditional instruction (I2) is dispatched, the Branch instruction (I2) will obtain the STF_tag, ITAG, W and the Compare Immediate instruction bits from the Compare_Imm_info register 205, and write the obtained data into the Issue Queue 204 along with the Branch instruction (I2). If the Compare Immediate instruction (I1) and the Conditional Branch instruction (I2) are dispatching in the same cycle, then bypass MUX 209 will select the information from the Mapper module 203 instead. Accordingly, the Conditional Branch instruction (I2) will then write into the Issue Queue 204 such that the S2 field of the Issue Queue 204 contains the Compare Immediate instruction's STF tag, ITAG, and W bits.

With continued referenced to FIG. 4, the Conditional Branch instruction (I2) can be issued immediately without waiting for the LSU to execute and write back its data. According to a non-limiting embodiment, the Conditional Branch instruction (I2) reads the operand RA from the STF 201 (if the RA data is valid), and writes the Compare Immediate field of the Compare Instruction (I1), the RA operand data (if the RA data is valid), and the S2_ITAG (used to snoop the LSU write back data) into the BCQ 404. When the RA data is not valid, the snoop compare module 408 snoops for the LSU write back data using the S2_ITAG of the Compare Immediate instruction (I2).

When the Load instruction (I0) is issued for execution, it will wake up both the Compare Immediate instruction (I1) and the Conditional Branch instruction (I2). The Compare Immediate instruction (I1) will be issued and executed as normal by the compare execution module 406, and the result delivered to the branch resolution module 410. When the snoop compare module 408 detects that the LSU write back data is available, it obtains the LSU write back data and writes it into the BCQ 404, e.g., in the BCQ's RA field at S2_ITAG snoop compare's hit location. The BCQ 404 can now execute the Compare Immediate instruction (I1) by comparing the compare immediate field data obtained by the Compare Immediate module (IMM) 400 with the RA field obtained by the operand module (e.g. Compare Immediate's RA field) 402, and generate a condition code. When the condition code is available, the branch prediction can be resolved, and the Conditional Branch instruction (I2) can finish at this time. If the branch is mis-predicted, then a flush request will be broadcasted to flush out the wrong instruction stream and the correct stream is re-fetched.

Figure 5:
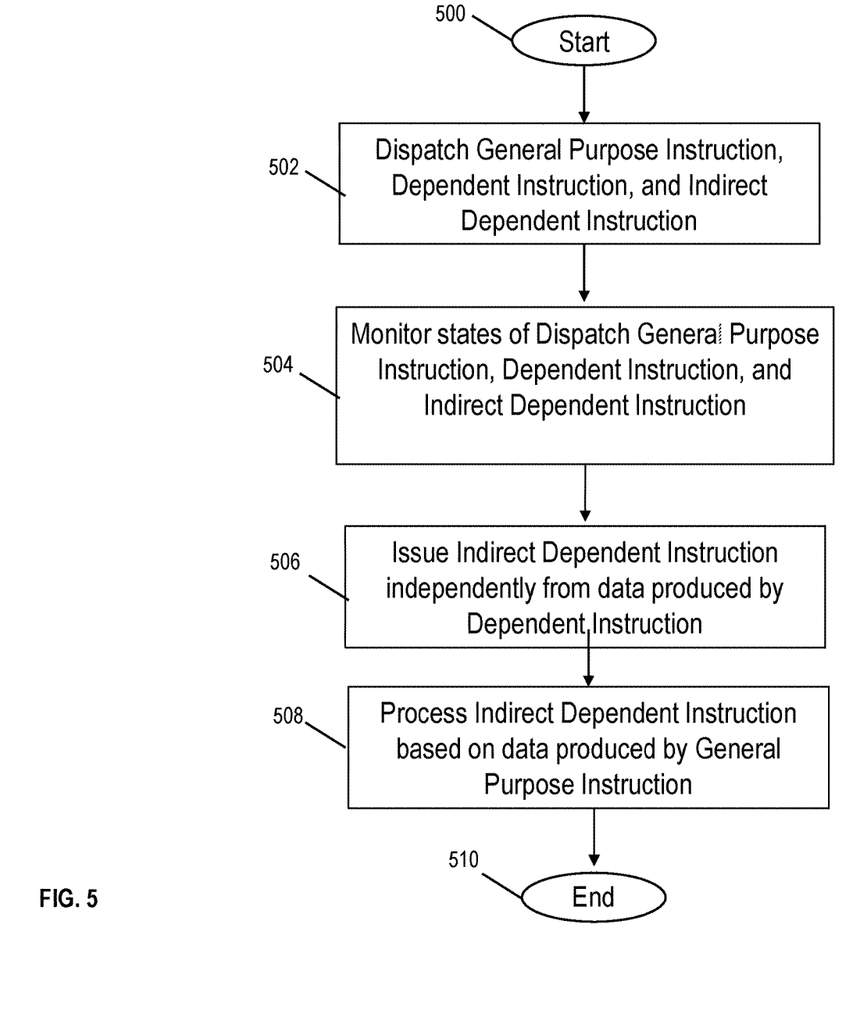
FIG. 5 is a flow diagram depicting a method of performing a dependency skipping operation according to a non-limiting embodiment.
Figure 6:
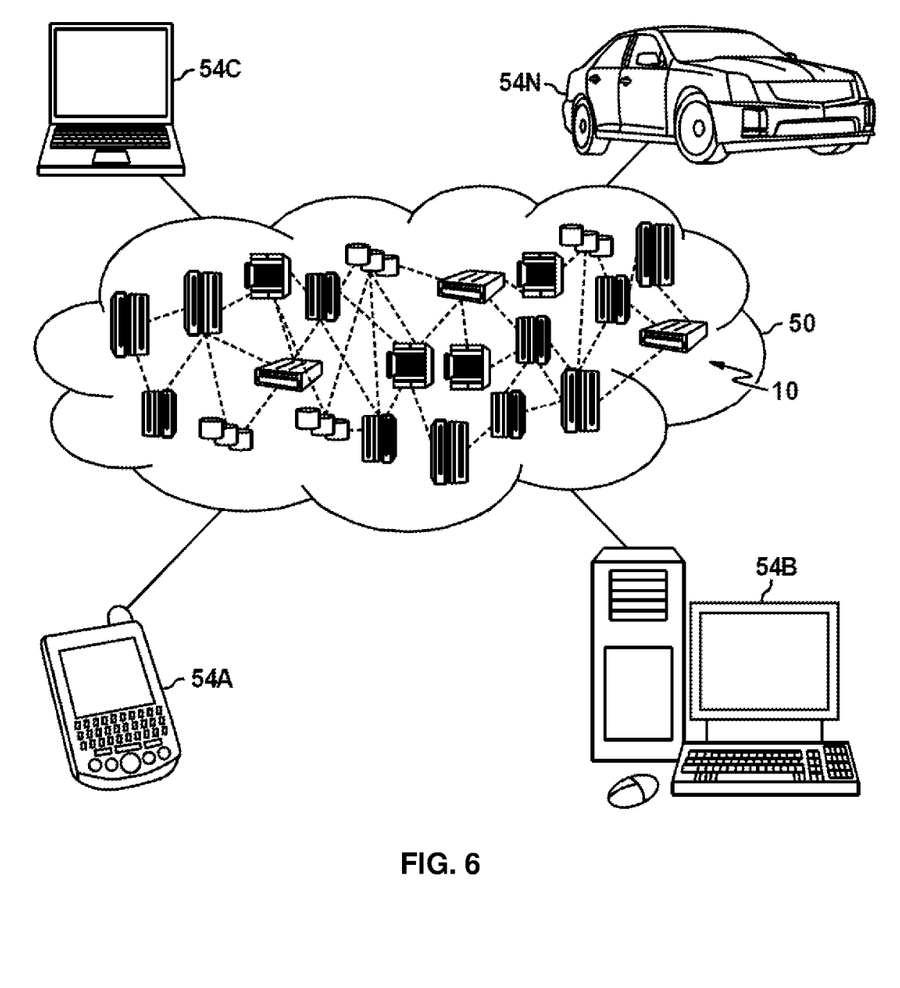
FIG. 6 depicts a cloud computing environment according to one or more embodiments of the present invention.
Figure 7:
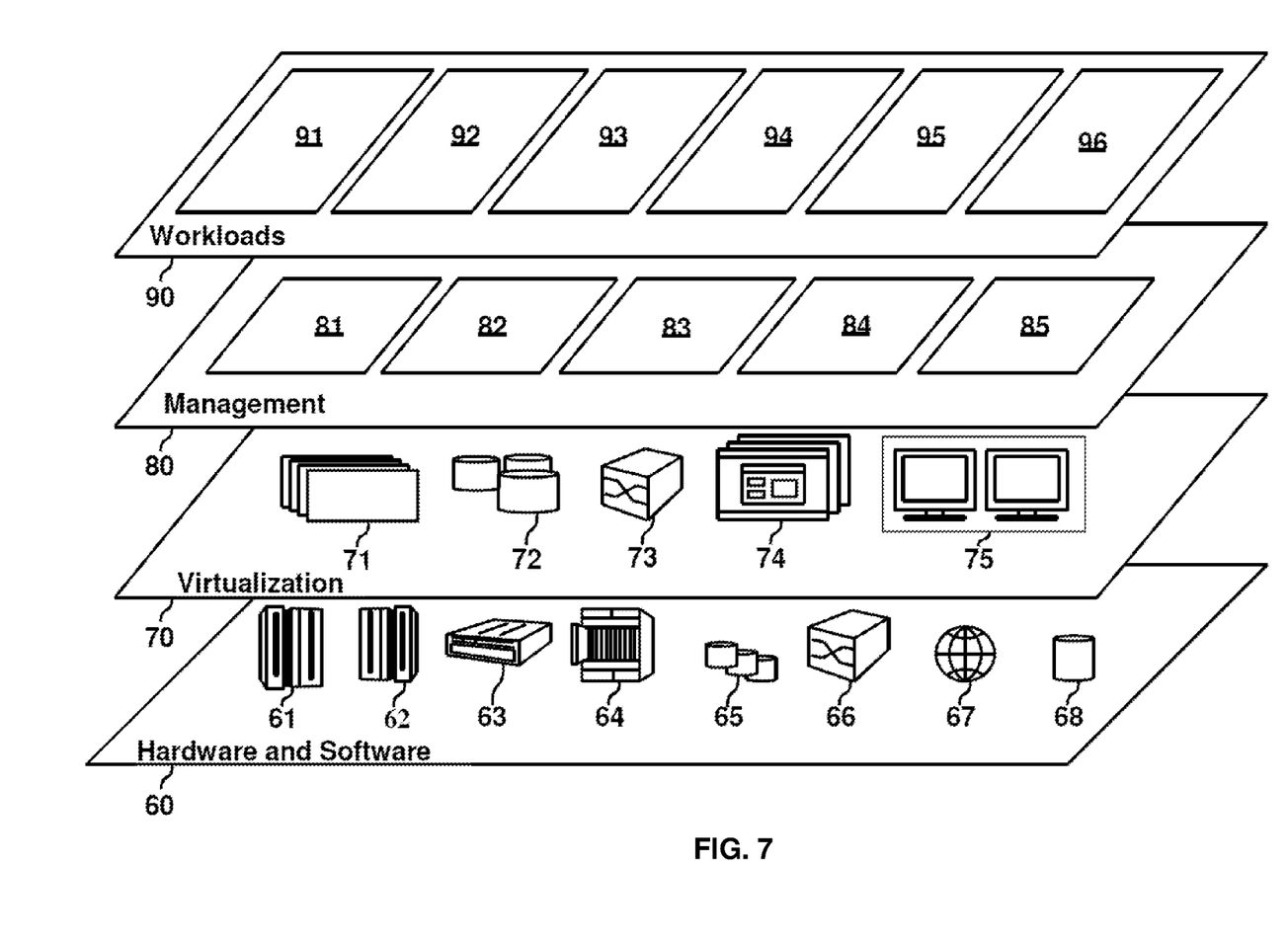
FIG. 7 depicts abstraction model layers according to one or more embodiments of the present invention.

Turning now to FIG. 5, a flow diagram illustrates a method of performing a dependency skipping operation according to a non-limiting embodiment. The method begins at operation 500, and at operation 502 a plurality of instructions are dispatched. The plurality of instructions include a general purpose instruction configured to produce first data, a dependent instruction configured to produce second data, and an indirect dependent instruction configured to produce third data. At operation 504, the instruction states of the general purpose instruction, the dependent instruction, and the indirect dependent instruction are monitored. At operation 506, the indirect dependent instruction is issued independently from the second data produced by the dependent instruction. At operation 508, the indirect dependent instruction is processed based on the first data produced by the general purpose instruction, and the method ends at operation 510.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

As described herein, various non-limiting embodiments of the present disclosure provide a processor that includes a dependency skipping execution unit configured to perform a dependency skipping execution operation. The dependency skipping execution operation allows a Conditional Branch to skip waiting for a Compare Immediate instruction to execute and instead allows the Branch to wait for the Load instruction to execute and produce the corresponding result. When the Load instruction is producing the result, the dependent Compare instruction will be woken up to issue and execute. The indirect dependent instruction, (i.e., the Conditional Branch instruction), will also wake up simultaneously with the Compare Immediate instruction. Thus, the Conditional Branch instruction and the Compare Immediate instruction can essentially be issued and executed in parallel (e.g., simultaneously) with one other. Accordingly, the register dependency skipping execution described according to one or more non-limiting embodiments allows the Conditional Branch instruction to execute and produce its result without waiting for the Compare Immediate instruction to finish execution (e.g., independent from the instruction state or result associated with the Compare Immediate instruction). In this manner dependency latency is reduced so as to improve the overall performance of the processor and computer system.

Various embodiments of the present disclosure are described with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer processor comprising:
   a dispatch stage configured to dispatch a plurality of instructions, the plurality of instructions including a general purpose instruction configured to produce first data, a dependent instruction configured to produce second data, and an indirect dependent instruction configured to produce third data; and
   a dependency skipping execution unit configured to monitor the plurality of instructions and to process the indirect dependent instruction in response to the general purpose instruction producing the first data, wherein the indirect dependent instruction is issued independently from the second data produced by the dependent instruction,
   wherein the dependency skipping execution unit comprises:
   a Compare Immediate module configured to obtain the second data associated with the dependent instruction;
   an operand module configured to obtain the third data associated with the indirect dependent instruction in parallel with the second data obtained by the Compare Immediate module;
   a vector scalar unit (VSU) execute module configured to generate a condition code result based on a comparison between the second data and the third data; and
     a branch resolution module configured to process the indirect dependent instruction based on the condition code result.

2. The computer processor of claim 1, wherein the indirect dependent instruction is issued in parallel with the dependent instruction.

3. The computer processor of claim 1, wherein the general purpose instruction is a Load instruction, the dependent instruction is a Compare Immediate instruction, and the indirect dependent instruction is a Conditional Branch instruction.

4. The computer processor of claim 3, wherein the Compare Immediate instruction is dispatched before the Conditional Branch instruction, and the Load instruction is dispatched before each of the Compare Immediate instruction and the Conditional Branch instruction.

5. The computer processor of claim 1, wherein the dependency skipping execution unit comprises:
   a Compare Immediate module configured to obtain the second data associated with the dependent instruction;
   an operand module configured to obtain the third data associated with the indirect dependent instruction in parallel with the second data obtained by the Compare Immediate module;
   a branch condition queue (BCQ) configured to store the second data and the third data, and to obtain load/store write back data; and
   a branch resolution module configured to process the indirect dependent instruction,
   wherein the vector scalar unit (VSU) execute module is configured to receive the second data and the third data in response to the BCQ receiving the load/store write back data, and generate a condition code result based on a comparison between the second data and the third data, and
   wherein the branch resolution module processes the indirect dependent instruction based on the condition code result.

6. The computer processor of claim 5, wherein the dependency skipping execution unit further comprises:
   a snoop compare module configured to obtain the load/store write back data from a Load/Store Unit (LSU) and to deliver the load/store write back data to the BCQ.

7. A computer-implemented method comprising:
   dispatching, via a dispatch stage included in a processor, a plurality of instructions, the plurality of instructions including a general purpose instruction configured to produce first data, a dependent instruction configured to produce second data, and an indirect dependent instruction configured to produce third data;
   monitoring, via a dependency skipping execution unit included in the processor, the plurality of instructions;
   issuing, via the processor, the indirect dependent instruction independently from the second data produced by the dependent instruction; and
   processing, via dependency skipping execution unit, the indirect dependent instruction in response to the general purpose instruction producing the first data;
   wherein processing the indirect dependent instruction includes:
     obtaining, via a Compare Immediate module, the second data associated with the dependent instruction;
     obtaining, via an operand module, the third data associated with the indirect dependent instruction in parallel with the second data obtained by the Compare Immediate module;
     comparing the second data and the third data;
     generating, via a vector scalar unit (VSU) execute module, a condition code result based on the comparison between the second data and the third data; and
     processing, via a branch resolution module, the indirect dependent instruction based on the condition code result.

8. The computer-implemented method of claim 7, further comprising issuing, by the processor, the indirect dependent instruction in parallel with the dependent instruction.

9. The computer-implemented method of claim 7, wherein the general purpose instruction is a Load instruction, the dependent instruction is a Compare Immediate instruction, and the indirect dependent instruction is a Conditional Branch instruction.

10. The computer-implemented method of claim 9, further comprising:
dispatching the Load instruction before each of the Compare Immediate instruction and the Conditional Branch instruction; and
dispatching the Compare Immediate instruction before dispatching the Conditional Branch instruction.

11. The computer-implemented method of claim 7, further comprising:
obtaining, via a Compare Immediate module, the second data associated with the dependent instruction;
obtaining, via an operand module, the third data associated with the indirect dependent instruction in parallel with the second data obtained by the Compare Immediate module;
storing, via a branch condition queue (BCQ), the second data and the third data;
delivering load/store writeback data to the BCQ and delivering the second data and the third data to the VSU execute module in response to the BCQ receiving the load/store writeback data;
comparing, via the VSU execute module, the second data and the third data;
generating, via the VSU execute module, a condition code result based on a comparison between the second data and the third data; and
processing, via a branch resolution module, the indirect dependent instruction based on the condition code result.

12. The computer-implemented method of claim 11, further comprising:
obtaining, via a snoop compare module, the load/store write back data from a Load/Store Unit (LSU); and
delivering the load/store write back data from the snoop compare module to the BCQ.

13. A computer program product comprising a computer readable storage medium having program instructions embodied therewith, the program instructions executable by one or more processors to cause the one or more processors to perform operations comprising:
dispatching, via a dispatch stage included in a processor, a plurality of instructions, the plurality of instructions including a general purpose instruction configured to produce first data, a dependent instruction configured to produce second data, and an indirect dependent instruction configured to produce third data;
monitoring, via a dependency skipping execution unit included in the processor, the plurality of instructions;
issuing, via the processor, the indirect dependent instruction independently from the second data produced by the dependent instruction; and
processing, via dependency skipping execution unit, the indirect dependent instruction in response to the general purpose instruction producing the first data,
wherein processing the indirect dependent instruction includes:

obtaining, via a Compare Immediate module, the second data associated with the dependent instruction;
obtaining, via an operand module, the third data associated with the indirect dependent instruction in parallel with the second data obtained by the Compare Immediate module;
comparing the second data and the third data;
generating, via a vector scalar unit (VSU) execute module, a condition code result based on the comparison between the second data and the third data; and
processing, via a branch resolution module, the indirect dependent instruction based on the condition code result.

14. The computer program product of claim 13, wherein the operations further comprise issuing, by the processor, the indirect dependent instruction in parallel with the dependent instruction.

15. The computer program product of claim 13, wherein the general purpose instruction is a Load instruction, the dependent instruction is a Compare Immediate instruction, and the indirect dependent instruction is a Conditional Branch instruction, wherein the Load instruction is dispatched before each of the Compare Immediate instruction and the Conditional Branch instruction, and wherein the Compare Immediate instruction is dispatched before the Conditional Branch instruction.

16. The computer program product of claim 13, wherein the operations further comprise:
obtaining, via a Compare Immediate module, the second data associated with the dependent instruction;
obtaining, via an operand module, the third data associated with the indirect dependent instruction in parallel with the second data obtained by the Compare Immediate module;
storing, via a branch condition queue (BCQ), the second data and the third data;
delivering load/store writeback data to the BCQ and delivering the second data and the third data to a vector scalar unit (VSU) execute module in response to the BCQ receiving the load/store writeback data;
comparing, via the VSU execute module, the second data and the third data;
generating, via the VSU execute module, a condition code result based on a comparison between the second data and the third data; and
processing, via a branch resolution module, the indirect dependent instruction based on the condition code result.

17. The computer program product of claim 16, wherein the operations further comprise:
obtaining, via a snoop compare module, the load/store write back data from a Load/Store Unit (LSU); and
delivering the load/store write back data from the snoop compare module to the BCQ.

* * * * *